INVENTOR.
Raymond J. Poulin

July 10, 1962  R. J. POULIN  3,043,234
OPPOSED-ROTOR RADIAL PISTON MOTOR, PUMP AND
POWER GENERATOR
Filed July 27, 1959  4 Sheets-Sheet 2
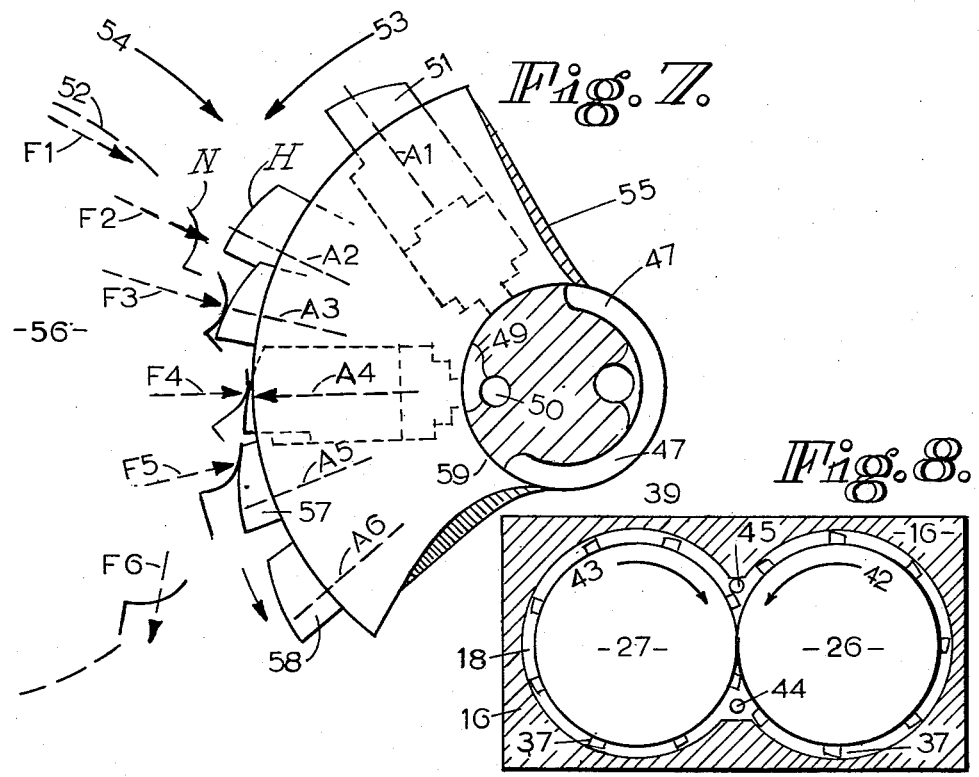
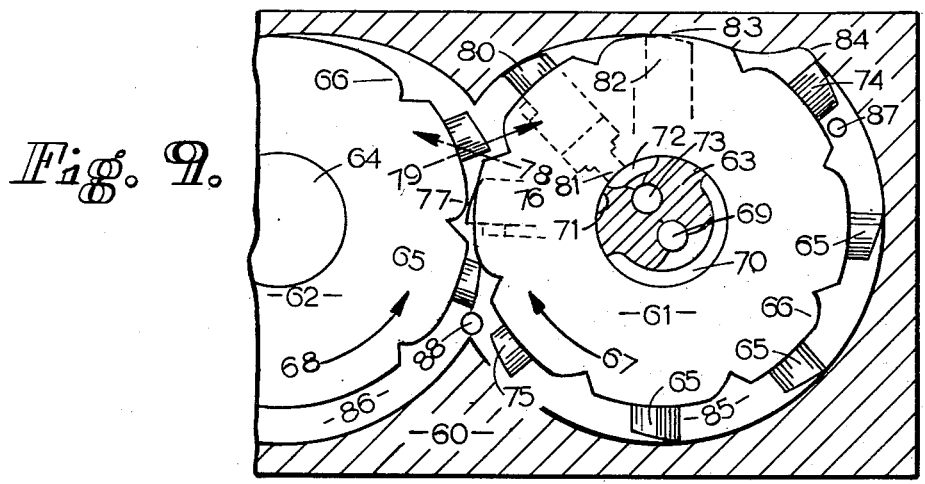
INVENTOR.
Raymond J. Poulin
BY

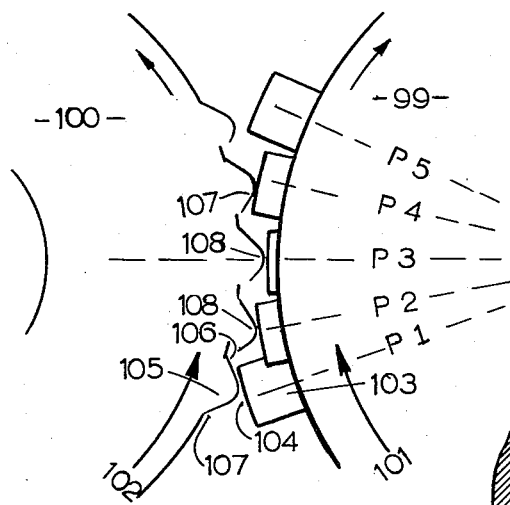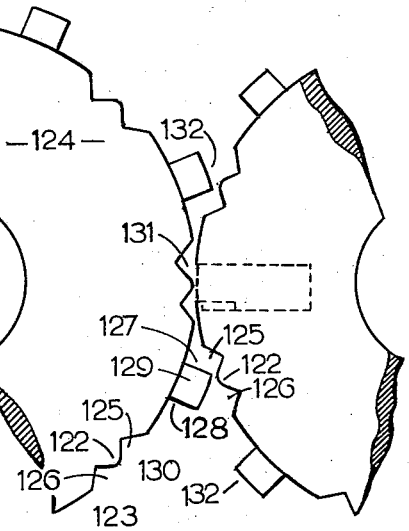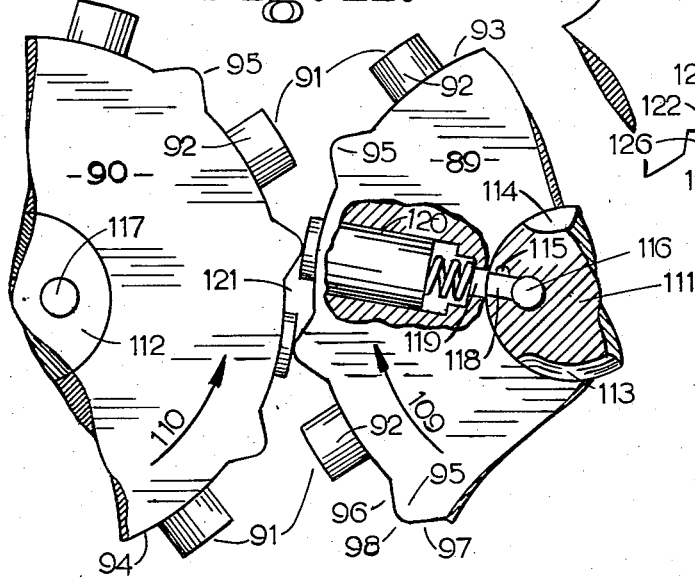

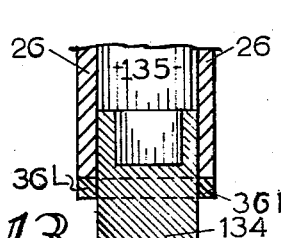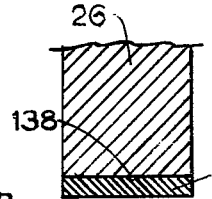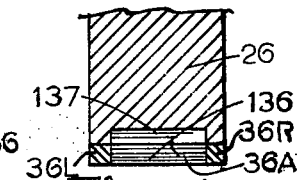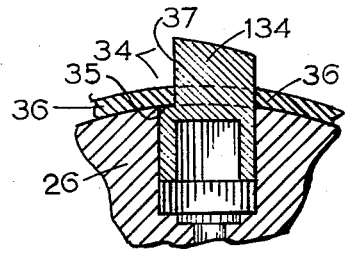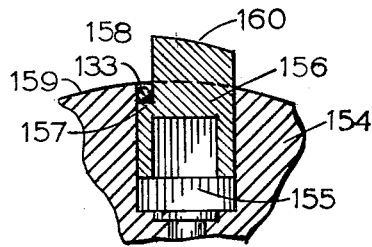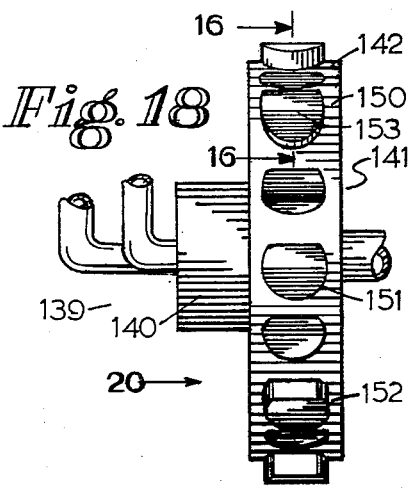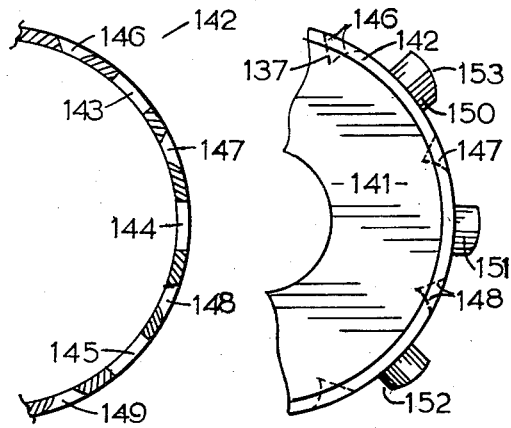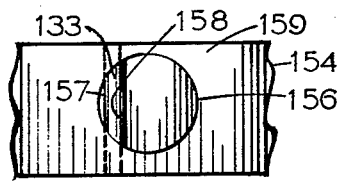

United States Patent Office 3,043,234
Patented July 10, 1962

3,043,234
OPPOSED-ROTOR RADIAL PISTON MOTOR, PUMP AND POWER GENERATOR
Raymond J. Poulin, P.O. Box 808, Topanga, Calif., assignor of one-half to Edward H. Rose, Santa Monica, Calif.
Filed July 27, 1959, Ser. No. 829,711
22 Claims. (Cl. 103—161)

The present invention relates generally to radial piston pumps, motors or power generators and especially to the opposed-rotor type of such devices in which the pistons of each rotor are depressed by engagement with the surface of the other rotor, and more particularly it relates to certain improvements in the conformation of the pistons and the rotor surfaces engaged thereby whereby a device of this character will function as a rotary piston pump, vane pump and gear pump simultaneously while rotating in one direction, and when provided with alternate porting means and suitably shaped piston heads and contacting surfaces, functions as an internal combustion engine, power generator, supercharger, etc.

More specifically, the improvements which constitute the present invention relate directly to the opposed-rotor radial piston pump invention on which a copending application for United States patent was filed January 22, 1958, with amendment dated November 14, 1958, bearing Serial Number 710,523, and reference is made to the earlier application for more complete details regarding the general structure of the complete device since the improvements disclosed herein are mainly supplemental to and dependent upon the structure as originally disclosed.

Experience gained from exhaustive tests made with a number of prototypes of radial piston pumps and motors of the so-called opposed-rotor type now indicate the desirability of certain modifications and improvements, some of which are believed essential to the further refinement of the general art. Variations in the pistons and in the conformations of the piston heads and the rotor surfaces they engage while being depressed are considered necessary to minimize wearing of the moving parts. Other conformations of the engaging surfaces have been found essential to successful reversibility of rotation and to meet other functional requirements. It has further been found advisable to provide means integral with the main structure to furnish fluid or fuel under moderate pressure to the radial pistons. Additionally, various modifications in the porting provided in the shafts or pintles on which the rotors revolve was found necessary for proper operation of the device as an internal combustion engine or pressure generator.

The present invention has been made with the foregoing considerations in mind and can be said to have a plurality of important objectives.

One important object of the present invention is the provision of pistons for opposed rotor radial piston pumps adapted in conformation so as to cause the least possible wear to the pistons and the surfaces of the rotors contacted thereby.

Another important object of the present invention is the provision in a device of the character described of piston heads and contacting surfaces adapted in conformation so as to completely close the space between the two rotors upon engagement with the surface of the opposite rotors, thereby enabling the use of the device as a vane pump or supercharger supplying fluid under pressure to the inlet of the opposed rotor radial piston system.

An additional important object of the present invention is the provision of a device of the character described in which the spur gears which drive the opposed rotors are adapted to serve simultaneously as a gear pump and power take off during the operation of the radial piston system.

A further object of the present invention is the provision of means in an opposed-rotor radial piston pump for regulating the volume output of the rotary piston pump by the introduction of fluid under pressure adjacent the piston heads thereof.

And a further important object of my invention is the provision in a device of the character described of hub members adapting the device for use as a pump internal combustion engine or power generator.

In brief, the present invention of improvements in opposed-rotor radial piston pumps and motors includes two rotors, conformed in the manner of round plinths, which are fitted with radial pistons having their heads normally extending outwardly of the circumferential peripheries of the rotors. The pistons are spaced radially of the rotors, and the rotors are relatively positioned whereby, as they are rotated in tangential adjacency each piston head is engaged by a peripheral surface or interspace between two pistons of the other rotor, each interspace being arcuate and complementary to the form of the piston head and effective to depress the piston inwardly of its bore by force directed axially of the piston during the entire period of contact, including both the inward and outward movement of the piston.

Thus, when the device is operated as an internal combustion engine or power generator, with means provided for firing when the piston has reached its limit of inward movement, the force of the arcuate surface effective to depress the piston and compress the fuel thereunder is imposed axially of the piston, and the force of the piston moving outwardly after firing is similarly imposed axially of the piston upon the complementary arcuate surface of the interspace, thereby minimizing the amount of wear resulting in the side walls of the cylinders and to the contacting surfaces of the piston heads and arcuate interspaces.

Also included in the present invention are: substitute pintles having suitable porting and firing means therein for operation of the device as an internal combustion engine and pressure generator; alternate conformations of the rotor surfaces and piston heads effective to reduce the mean spacing between the rotors in order to improve the efficiency of the unit with respect to its operation as a vane pump; and an alternate conformation of the inner sidewall of the fluid tight housing to provide camming surfaces for the pistons during operation as an engine or power generator.

Additional variations in the embodiment and further objects of my invention will become apparent in the following detailed specification when taken together with the references contained therein to the accompanying drawings, of which:

FIGURE 7 is a schematic diagram showing progressively the relative positions of a piston head and the arcuate portion of the peripheral interspace on the opposite rotor during, and immediately before and after, the engagement thereof;

FIGURE 8 is a schematic diagram illustrating the manner in which the device performs as a vane pump;

FIGURE 9 is a similar schematic diagram showing the device during operation as an internal combustion engine, using the alternate pintles and rotating oppositely from the direction indicated in previous figures;

FIGURE 10 is a schematic diagram showing progressively the relative positions during the period of contact of an alternate conformation of the rotor interspace and the piston head;

FIGURE 11 is a fragmentary view of two rotors having interspaces and piston heads of the type shown in FIGURE 10, and indicating the angular relationship of one to the other during the period of contact, and FIGURE 12 is a fragmentary plan view of two rotors having arcuate sections between their piston heads similar to the conformation shown in FIGURES 10 and 11 but with the arcuate portions of the interspaces disposed within the circumference of the rotors, thereby keeping them in closer tangential adjacency.

Figure 1:
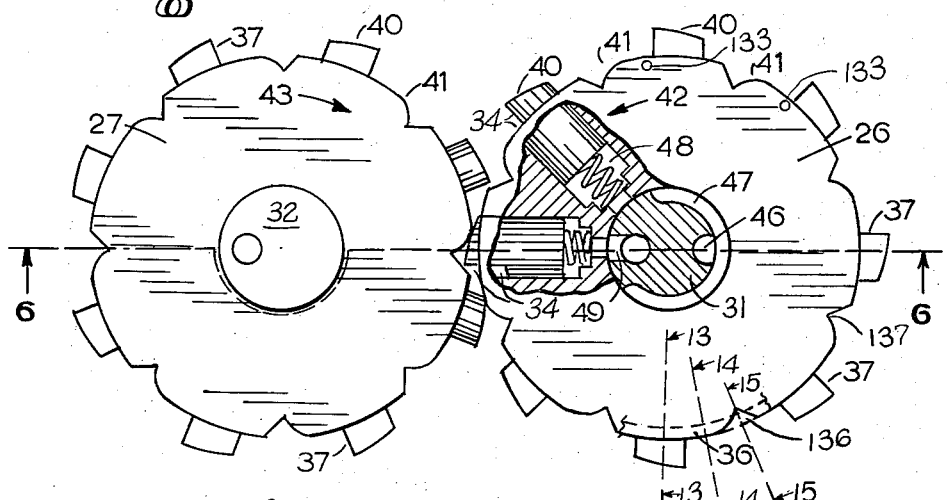
FIGURE 1 is a plan view, partially in horizontal section, showing an opposed-rotor assembly constructed in accordance with my invention as seen with the cover of the housing removed and viewed along the line and in the direction indicated by the arrows 1—1 in FIGURE 6.
Figure 2:
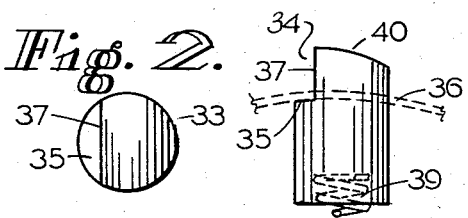
FIGURE 2 is a plan view of the top of a piston constructed in accordance with my invention.

FIGURE 13 is a fragmentary cross sectional view of a typical rotor taken on an axial plane along the line and in the direction indicated by the arrows 13—13 in FIGURE 1, showing a portion of a rotor with a radial bore, piston and piston retaining ring;

FIGURE 14 is a sectional view similar to FIGURE 13, but taken along the line and in the direction indicated by the arrows 14—14 in FIGURE 1, in which only the rotor and ring are seen;

FIGURE 15 is a sectional view similar to FIGURES 13 and 14, but taken along the line and in the direction indicated by the arrows 15—15 in FIGURE 1, showing the rotor and ring, and an arcuate groove extending through the ring into the body of the rotor;

FIGURE 16 is a fragmentary sectional view of a rotor taken on an axially transverse plane, showing a piston and the piston retaining ring as they would be seen along the line and from the direction indicated by the arrows 16—16 in FIGURE 18;

FIGURE 17 is a sectional view similar to FIGURE 16, showing the manner in which a piston is secured within a radial bore by a pin or insert member instead of the circumferential retaining ring.

FIGURE 18 is a side elevational view of a rotor equipped with a piston retaining ring, and showing the manner in which the peripheral grooves are extended through the ring into the body of the rotor.

FIGURE 19 is a fragmentary sectional view of a piston retaining ring as it would be seen along an extension of the line 16—16 in FIGURE 18, showing the perforations in which the pistons reciprocate, and the arcuately formed openings alternately disposed between the perforations and adapted to engage the heads of the pistons of an adjacent rotor;

FIGURE 20 is a fragmentary frontal or plan view of a rotor and retaining ring assembly as it would appear from the direction indicated by the arrow 20 in FIGURE 18; and FIGURE 21 is a fragmentary elevational view of the circumferential side wall of a rotor in which a piston is secured by means of a pin or insert member in the manner indicated in the sectional view of FIGURE 17.

Reference is again made to FIGURES 1 and 6 which, taken together, clearly illustrate the structure and arrangement of the opposed-rotor radial piston pump and motor in which the specific improvements described hereinafter are embodied.

Figure 6:
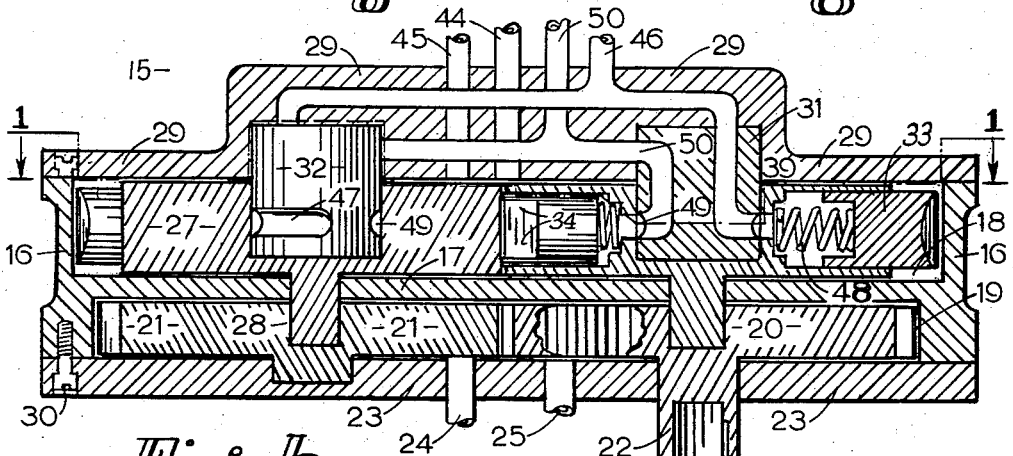
FIGURE 6 is a cross sectional view taken vertically of an opposed-rotor pump or motor assembly, showing the rotors in section as they would be seen along the line and from the direction indicated by the arrows 6—6 in FIG- URE 1, and showing one of the pump-type pintles in section.

The complete assembly, shown in vertical section in FIGURE 6, is designated generally by the numeral 15 and includes a generally rectangular housing having a vertically disposed peripheral sidewall 16 with a central horizontally disposed partitioning member 17 integrally formed interiorly thereof and providing separate substantially fluid-tight cavities 18 and 19 on opposite sides thereof.

Enclosed in the lower cavity 19 is a pair of mating spur gears 20 and 21, the former having a shaft 22, adapted for connection by conventional means with a power drive, extended downwardly through a fluid-tight aperture in the lower cover 23 through which are also extended the inlet and outlet ducts 24 and 25 respectively. The shaft 22 serves as the power take off when the device is used as an internal combustion engine, and is connected to a suitable power supply such as an electric motor when the device is used for any one or combination of its pumping functions.

Interiorly of the upper cavity 18 are the rotor assemblies 26 and 27 which are adapted by structural means as indicated at 28 to interfit respectively with the spur gears 20 and 21 so as to be rotationally rigid therewith. The rotors 26 and 27 are shown in plan view in FIGURE 1 as seen along the line and from the direction indicated by the arrows 1—1 in FIGURE 6. An upper cover 29 which completes the housing 15 is secured, as also is the lower cover 23, to the sidewall 16 by means of a plurality of bolts such as those indicated at 30.

Two shafts or pintles 31 and 32, interfitted into the cover 29 and rigid therewith, are extended downwardly axially of the rotors 26 and 27. The pintles are identical, both having the cylindrical form indicated at 32 in FIGURES 1 and 6, and the same internal ducting seen in the sectional views of the pintle 31; but the pintles are oppositely positioned interiorly of the chamber 18 so that the ports 49 of their exhaust ducts 50 both open inwardly. Also, in FIGURE 1 portions of the upper surface of the rotor 26 and the pintle 31 are broken away to provide a horizontal sectional view taken along the axes of the pistons and radial bores of the rotors.

The pistons, as clearly indicated in the FIGURES 2–5, in which they are generally designated by the numeral 33, are formed in the manner of right cylinders except for the segmental notch 34 which is defined by the transverse shoulder 35 and the axially parallel planar surface 37. The shoulder 35 serves to keep the piston from moving outwardly of its bore as, for instance, by engagement with an insert member in the side wall of the bore or by engagement with the inner surface of a perforate retaining ring disposed circumferentially of the rotor as indicated at 36 in FIGURES 1 and 3. The planar surface 37, by reason of its adjacency to the straight edge of an insert member in the rotor or of a perforation in the retaining ring 36, keeps the piston 33 from rotating axially within its bore.

Several methods for holding the pistons in the bores have been tested, and two methods which are preferred mainly because of their obvious simplicity is the circumferential retaining ring, indicated at 36 in FIGURE 1, and loose or threaded insert members, the exposed heads of which are seen at 133 in FIGURE 1.

The construction of the rings, such as 36, will be better understood by reference to FIGURES 13, 14 and 15, which are fragmentary sectional views taken along the lines and in the directions indicated by the respective arrows 13—13, etc. in FIGURE 1, and more clearly understood from the fragmentary sectional view of FIGURE 16 which is taken as indicated by the arrows 16—16 in FIGURE 18.

In FIGURE 13 the piston 134 is seen extended outwardly of the radial bore 135 in the rotor 26 and through the ring 36 of which only the opposite edges 36L and 36R are visible. In FIGURE 15 the ring is shown to include an arcuate side 36A of an irregular opening 136 in the ring between the outer edge portions 36L and 36R. The irregular opening 136 in the ring combines with and registers over a grooved portion in the rotor body to form a complete groove having the same functional form as the grooves seen at 137 and 41 in FIGURE 1. In the sectional view of FIGURE 14, which is taken between the ring openings seen in FIGURES 13 and 15, the ring 36 is seen to extend completely across the outer edge 138 or the rotor 26.

The manner in which the openings in the ring and in the rotor combine to form complete grooves is also clearly illustrated in FIGURES 18–20 which, for convenience in visual reference, are positioned relative to a common axial centerline.

A typical rotor assembly 139 is shown in the side elevational view of FIGURE 18 to include a pintle 140 on which the rotor body 141 is journalled as seen in the fragmentary plan view of FIGURE 20. A piston retaining ring 142, shown in section in FIGURE 19, is disposed circumferentially of the rotor body 141, and is provided with a first plurality of uniform perforations such as 143—4—5 which are regularly spaced circumferentially of the ring 142, and are adapted to receive slidably therein the outwardly extended piston heads indicated by the numerals 150—1—2. These piston heads are segmented so as to provide shoulder portions 35, clearly shown in FIGURES 3 and 16, which engage the inner surface of the ring 142, and thereby limit the outward movement of the pistons.

A second plurality of perforations such as 146—7—8—9 is disposed in the ring 142 alternately and intermediate of the first mentioned perforations. The second perforations are generally V-shaped, each having one arcuate side adapted to engage the arcuate outer surface of a piston head, such as the surface 153 of the piston 150 in FIGURES 18 and 20, in the manner described in considerable detail in reference to FIGURES 7 and 10.

The use of insert members such as those indicated at 133 in FIGURE 1 to hold the pistons interiorly of their bores is clearly illustrated in the sectional view of FIGURE 17 and the fragmentary plan view of FIGURE 21 which show a typical rotor 154 having therein a radial bore 155 and a piston 156 slidable axially of the bore. The piston 156 is provided with a shoulder 157 as previously described and designated by the numeral 35, and a flat axially parallel surface 158. The insert member 133 is entered through the rotor 154 close to the outer surface 159 thereof so as to intercept the bore 155 in the manner clearly shown in FIGURES 17 and 21. Thus the insert 133 serves both to keep the piston 156 from rotating axially in its bore 155, thereby maintaining the attitude of approach and contact of the arcuate outer piston surface 160 relative to its engagement with a peripheral notch in the opposed rotor, and the insert also keeps the piston from moving outwardly of the bore 155 because of centrifugal force or fuel pressure thereunder.

Although the insert members 133 and retaining rings 36 have been rather specifically defined in the foregoing description, it is not to be inferred that these are necessarily the only or the most suitable means for holding the pistons within their respective bores. In fact, one test prototype which performed very satisfactorily was equipped with pistons having two diametrically opposite segments, of the type indicated at 34, in their heads, and having two axially transverse shoulders similar to those shown at 35 and 157 in FIGURES 16, 17 and 21.

Figure 3:
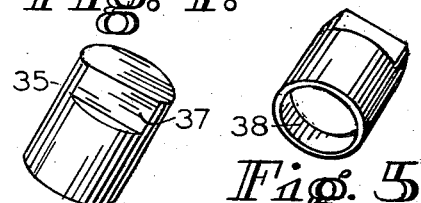
FIGURE 3 is a side elevational view of the piston shown in FIGURE 2.

Similarly, the use of coil springs such as that indicated at 39 in FIGURE 3 and also shown in other figures, is optional according to the function for which the device is used; when fluid under pressure is supplied to the cylinder cavities, such as 48 in FIGURES 1 and 6, no springs are required, and when the rotors are turning at relative high speeds centrifugal force alone is sufficient to move the pistons outwardly of the bores. Hence, the showings made of the springs and piston retaining means are intended to be indicative of function rather than limitative in terms of structure.

Figures 4, 5:
FIGURE 4 is a frontal elevational view in perspective of the piston shown in FIGURES 2 and 3.
FIGURE 5 is an angular view in perspective similar to FIGURE 4 but showing the bottom and inner cavity of the piston.

The bottom of the piston 33 is recessed at 38, as best seen in FIGURE 5, the recess 38 serving as a seat for one end of a coil spring 39 and providing space in which the spring 39 is received when the piston is depressed and the spring compressed.

The arcuate surface 40 of the head of the piston 33, which is clearly shown in the side elevational view of FIGURE 3, is adapted for tangential rotary engagement with the convex side of a notch, such as 41 in FIGURE 1, disposed intermediate of two adjacent pistons in the opposite rotor as will be more fully described hereinafter.

Operation of the device as a pump can be readily understood by reference jointly to FIGURES 1 and 6 in which pistons having the configuration indicated in FIGURES 2–5 and having arcuate heads such as shown at 40 are shown installed in the rotors 26 and 27. It will be noted that the rotors are relatively positioned so that the piston heads of one are engaged by the arcuate sides of the notches such as 41 disposed in the rotor periphery intermediate of the pistons of the other. It is further significant that the contact notches 41 are disposed with their arcuate sides curved in the direction of rotation of the rotors.

It will be understood, however, that the above described relative conformation of the piston heads 40 and the arcuate sides of the notches 41 in the rotor walls is preferred only when the device is operating as a pump and the pistons are under compression only during the compression half of the contactual arc of rotor movement. When operating as an internal combustion engine or power generator, and or any combination thereof, it is necessary that the piston heads and their respective arcuate contact areas be adapted to both impose and to receive thrust; the piston head receiving the thrust of the rotor area during the compression phase, and the piston head imposing thrust upon the rotor area during the firing phase and outward movement of the piston. Alternate conformations of the pistons and notches which are better suited to the latter purpose are set forth hereinafter and illustrated by other figures in the drawings.

Again in FIGURE 1, the rotors 26 and 27 revolve in the direction indicated by the arrows 42 and 43 with the rotor 27 turning clockwise. Fluid is supplied to the lower chamber 19 in FIGURE 6, in which the spur gears 20 and 21 operate as a gear pump, through the inlet duct 24 and is discharged under moderate pressure through the outlet duct 25.

Similarly, as is clearly indicated in the schematic diagram of FIGURE 8, fluid is supplied through the inlet duct 44 to the chamber 18 in which the rotors 26 and 27 and their extended piston surfaces 37 operate in the manner of a vane pump, and is discharged at moderate pressure and substantial volume through the exhaust duct 45.

To serve the radial pistons, fluid is supplied through the inlet duct 46, seen in FIGURE 6, which communicates through the pintles 31 and 32 with the circumferential channels 47 opening laterally and circumferentially thereof. During the inlet phase of the rotor revolution, the return springs 39 force the pistons 33 outwardly of the bores into adjacency with the side wall 16, and fluid from the channels 47 is admitted to the cavities such as 48 beneath the extended pistons.

However, if fluid under moderate pressure is directed from the discharge duct 45 of the vane pump to the inlet duct 46 of the radial pistons, the use of the springs is not required and volume and pressure output of the radial pistons may be varied and controlled by the fluid pressure maintained within the cavity 18 between the inner surface of the side wall 16 and the circumferential peripheries of the rotors 26 and 27, pressure therein being effective to restrain the outward movement of the piston heads 40, thereby decreasing volume output but maintaining the fluid pressure of the radial piston system.

During the discharge or compression portion of the rotor revolution, each piston of both rotors is engaged by arcuate areas of the other rotor in the manner indicated in FIGURES 1 and 7, the piston being forced inwardly of its respective bore, thereby pressing the fluid in the cavity 48 through the opening 49 in the pintle 31 and thence through the high pressure discharge duct 50 as is clearly seen in FIGURE 6.

The potential cooperation between the triple pumping functions of the device may be understood from the foregoing description and it will be further understood, by reference to FIGURE 6, that fluid pressure may be progressively increased by ducting directly from one pumping system to another. For instance, fluid admitted to the gear pump through the inlet duct 24, may be directed from the gear pump outlet duct 25 to the inlet 44 of the vane pump, of FIGURE 8, and from the outlet 45 thereof to the inlet duct 46 of the radial piston system, being finally discharged under high pressure through the outlet duct 50. Regulation of the volume or pressure output between either of these stages will be sharply reflected in the volume-pressure ratio of the final output, as has been explained above.

As previously mentioned, contact between the piston heads 40 and the arcuate surfaces 41 shown in FIGURE 1, occurs along a line of tangency parallel to the axes of the rotors 26 and 27 and moves across the two arcuate surfaces as the rotors revolve. And when, in the foregoing description, the arcuate surfaces 40 and 41 have been said to be complementary it has not been intended to imply that one interfits or nests within the other. Instead, it is meant that the arc of one complements that of the other so that, insofar as possible, each individual piston is axially normal to the arc of its respective rotor notch and therefore in substantial axial alignment with the direction of force during the entire period of tangential contact of the arcuate surfaces.

Since the force effective to depress the piston is imposed from the periphery of the rotor, the direction from which it is applied changes in accordance with the movement of the rotor notch, and the arcuate conformations of the tangentially contacting surfaces are complementally effective to keep the direction of force and the axis of the piston in substantial longitudinal alignment. This particular feature of the device of the present invention is considered sufficiently significant to warrant further explanation.

The diagram of FIGURE 7 is purely illustrative, and is intended to show the angular relationship of one piston and the respective arcuate rotor surface at various points before, during and after the rotational contact thereof. For purposes of clarity, the interfitting spur gears, seen at 20 and 21 in FIGURE 6, which provide interlocked synchronous movement of the rotors, are not shown.

A typical piston 51 having a curved outer end surface designated by the letter H and the respective arcuate surface n of a typical peripheral notch are rotated in the direction indicated by the arrows 53 and 54 in FIGURE 7, and it will be remembered that the diagram shows the outer surface H of only the one piston 51 and its respective contacting notch surface n in a plurality of positions. The rotor in which the piston 51 is disposed is shown fragmentally at 55, and only a part of the periphery of the opposite rotor 56 is indicated at 52.

In the position of mutual approach in which they first appear at the top of FIGURE 7, the axial centerline of the piston 51, designated by the broken line A–1, is seen to be widely divergent from the direction of potential peripheral force of the rotor surface 52, which is indicated relatively by the arrow F–1.

In the next position the arcuate surfaces N and H are about to engage, and the axis A–2 of the piston 51 is rapidly approaching alignment with the relative direction of potential force F–2 of the notch surface N. In the third position the surfaces N and H are engaged and the piston is partially depressed. It will be observed that the axis A–3 of the piston is substantially normal to the arc of the notch. Meanwhile, the direction of effective force as indicated at F–3 is turning outwardly of the rotor 56, and finally changes completely from its circumferential direction at F–1 to a radial direction at F–4, at which point it is seen to be in longitudinal alignment with the axial centerline A–4 of the piston and also in coincidence with the plane of the rotational axes of the rotors. This also is the point at which the piston is completely depressed and beyond which the effective force of the rotor surface relative to the piston is cancelled. Thereafter the notch surface offers only passive resistance to the outward movement of the piston as indicated at F–5 until the surfaces H and N are completely separated and the direction of potential force as indicated at F–6 may again be considered as being circumferential of the rotor 56.

Piston heads and engaging rotor surfaces such as H and N constructed in accordance with the present invention in the manner described above are preferred for use in opposed-rotor radial piston devices employed as pumps since, as has been previously explained but may now be better understood, the pumping function imposes thrust upon the pistons only during the compression phase, or from the time the contacting surfaces first engage until the piston is completely depressed. Stresses thereafter are inconsiderable, in fact, in the above described embodiment it is doubtful that the pistons move outwardly in the manner indicated at 57 and 58 in FIGURE 7 until the inner apertures of their bores pass the solid sidewall area of the pintle indicated at 59 and begin to overlap the circumferential inlet channel 47.

Experiments with prototype pumping devices provided with contacting surfaces arcuately formed in the manner described have proved substantially more satisfactory than other forms in smoothness of operation, absence of vibration, wearing of the contacting surfaces and, most importantly, from the standpoint of the amount of wear occasioned interiorly of the radial bores.

Full advantage may also be taken of the efficient cooperation of these arcuate contacting surfaces, as set forth above, when the same general combinations of rotors and pistons is adapted with differently ducted pintles so as to operate in the manner of an internal combustion engine. A typical device of this character is illustrated in FIGURE 9 in which different reference numerals have been used to designate certain previously described parts in order to avoid confusion with other variations of the device.

The arrangement as an internal combustion engine is seen in FIGURE 9 to include a fluid-tight housing 60, shown incompletely, from which the cover member such as 29 in FIGURE 6 has been removed to reveal the rotor 61 and a portion of the opposed rotor 62 being respectively journalled on the stationary pintles 63 and 64 which are normally secured rigid with the cover.

The disposition of the radial bores within the rotors 61 and 62 and the conformations of the pistons such as 65 and the peripheral notches 66 are the same as those previously described in connection with FIGURES 1–7. Also, the rotors are intergeared for contra-rotation by spur gears such as 20 and 21 and is provided with a power take off as shown at 22 in FIGURE 6.

However, when the device is operated as an internal combustion engine the rotors turn in the direction indicated by the arrows 67 and 68. The pintles, shown typically at 63, are provided with fuel inlet ducts 69 opening into circumferential channels 70 and exhaust apertures as at 72 opening into the exhaust duct 73, and ignition units such as glow plugs indicated at 71, all of the foregoing opening laterally of the pintles so as to align and communicate with the inner openings of the radial bores.

Operation of the device as an internal combustion engine will be readily understood by reference to FIGURE 9. As a typical piston rotates from the position at the upper right of the figure indicated at 74 to the diametrically opposite position at 75, the inner opening of the radial bore in which it is disposed moves in alignment with the circumferential inlet channel 70 and is filled with fuel; as it rotates upwardly in the direction of the arrow 67 to the position indicated at 76, the typical piston is engaged by the arcuate peripheral surface 77 of the rotor 56 and is forced inwardly of the radial bore, thereby compressing the fuel previously received in the bore. Immediately thereafter, the inner opening of the bore rotates into contact with the glow plug 71 which ignites the fuel compressed under the piston, thereby driving the piston outwardly against the arcuate surface 77, the maximum thrust being exerted substantially in the direction of and in alignment with the arrow 78, and oppositely, as indicated by the arrow 79, in the case of a piston in the rotor 62.

When analyzing the efficiency of an engine of this general character it might, at first, be thought that the piston thrust would react, at least to some extent, upon the rotor in which the piston is fired, and that a division of the thrust between the two rotors would result in an engine of doubtful efficiency. It will be observed from the figure, however, that the thrust is exerted radially of the stationary pintle on which the rotor is journalled, and is imposed peripherally and received circumferentially of the other rotor. Thus the explosive thrust is resisted by the stationary pintle with no effect upon the rotative speed of the rotor in which the firing occurs, and is imposed upon the readily movable perimeter of the other rotor.

As the typical piston moves upwardly to the position shown at 80, the opening 81 of the piston bore moves into communication with the exhaust aperture 72, and as it rotates further to the position shown at 82 the piston is forced inwardly of the rotor bore by an area of reduced clearance 83 in the sidewall of the housing 60, thereby discharging the combustion resultant vapors from the piston bore through the outlet duct 73; then, after passing the exhaust outlet, the piston moves outwardly again into the enlarged clearance space at 84 to complete one rotor revolution during which the fuel was admitted to the piston bore, compressed, fired and exhausted.

Also seen in FIGURE 9 is a typical use of the pistons indicated generally by the numeral 65, and the clearance chambers 85 and 86 between the inner wall of the housing 60 and the peripheries of the rotors 61 and 62 in the manner of a vane pump with fluid being admitted to the clearance chambers 85 and 86 through two inlet apertures such as 87 and forced outwardly of the chambers through a single outlet 88 adjacent the point of tangential engagement of the rotors. The fluid under pressure may be directed from the vane pump outlet 88 to the inlet ducts, such as 69 in the pintle 63, to serve the radial piston system when operating as an internal combustion engine, pump or pressure generator.

A somewhat different conformation of the arcuate piston heads and the contact areas they engage on the rotor surfaces is preferred when the opposed-rotor radial piston device is used as an internal combustion pressure generator, as is clearly illustrated in FIGURES 10–12. In FIGURE 11 the typical conformations are shown, and the cooperation between a pair of rotors, segments of which are designated as 89, and 90, is seen to be substantially the same as that described in connection with previous figures wherein the arcuate contact areas on each of the rotors serve to depress the piston heads of the other.

However, as seen in FIGURE 11, the outer surfaces 91 of the piston heads 92 are seen to be symmetrically curved substantially the same as the circumferential peripheries 93 and 94 of the rotors 89 and 90, and the contact areas on the rotor surfaces are conformed in the manner of outwardly extended axially parallel ridges, designated generally by the numeral 95, each ridge having two sides such as 96 and 97 of substantially equal width and being disposed equiangularly of the rotor peripheries, and terminated outwardly of the rotor in a rounded edge surface 98.

As has been previously mentioned with reference to the use of the opposed rotor radial piston device as an internal combustion pressure generator, it is highly important that the contacting surfaces of the rotors and pistons be conformed so as to cooperate just as efficiently when compressing the fuel internally of the piston bores as when imparting and receiving thrust generated by ignition of the fuel. The manner in which this is accomplished may be understood from FIGURE 10 which shows a typical piston 103 having an arcuate outwardly extended surface 104, and a typical rotor ridge 105 having angular sides 106 and 107 and a rounded edge 108 outwardly of the periphery of the rotor 100, the piston 103 and the rotor ridge 105 being shown in a number of relative positions before, during and after their engagement.

At the bottom of FIGURE 10 the piston 103 and ridge 105 are shown immediately before engagement in the relative position, radially of the rotors 99 and 100, designated as P–1 in which it can be seen that the piston surface 104 will first contact the adjacent side 106 of the ridge, then move outwardly of the side 106 and onto the edge 108 as indicated at position P–2. When the piston is completely depressed, in the radial position indicated at P–3, only the center of its surface 104 and the rounded edge 108 of the rotor ridge 105 are in contact. As the rotors rotate past the dead center position P–3, fuel beneath the piston is ignited and the piston moves outwardly of the rotor 99 as indicated at P–4 and imposes thrust against the edge 108 and then upon the side 107 of the ridge until they rotate out of engagement as indicated at P–5.

The operation as a pressure generator of a rotary piston device having contacting surfaces of the character described is illustrated in FIGURE 11 in which the general arrangement of associated parts is seen to be somewhat similar to that of the internal combustion engine shown in FIGURE 9; the main difference being in the pintles 111 and 112 which in addition to the fuel inlet channels, low pressure exhaust ports and glow plugs 113, 114 and 115 respectively, have high pressure outlet ducts 116 and 117 through which fluid pressure generated by the fuel explosions is transited outwardly of the device and ducted to a storage tank or directly to a conventional power unit such as an air motor, turbine, jet type engine, etc. The glow plug 115 is shown in the schematic diagram to be disposed in the side of the opening 118 communicating with the inner opening 119 of the radial bore 120, but in actual practice it is positioned interiorly of the pintle so as to communicate with the bore 120 at the time that the pressure therein is at its peak and the radial centerlines of the piston and ridge are aligned between the axes of the pintles.

Since the piston cannot move outwardly when in this position, the explosive force therefrom is directed into the outlet duct 116, the ambient pressure interiorly of the duct and the openings 118 and 119 causing the piston to move outwardly of the bore 120 and impose rotative force upon the adjacent ridge 95 of the opposite rotor.

As will be observed in FIGURE 11, it is necessary to space the rotors apart as indicated at 121 so that the outward point such as 98 of a contact ridge 95 will not press the outer surface 91 of a piston head 92 inwardly of the circumferential periphery 94 of the rotor. The interspace at 121, however, greatly reduces the efficiency of the rotors and piston heads with respect to their operation as a vane pump, in the manner described above and shown in FIGURE 8.

Accordingly, the present invention provides an alternate conformation as shown in FIGURE 12 in which the ridges indicated by the numeral 122 are inset within the circumferential periphery 123 of the rotor 124, and clearance spaces such as 125 and 126 are provided, adjacent each ridge, in which the leading edge 127 and the trailing edge 128 of a typical piston head 129 are respectively received at the beginning and end of the period of engagement. Since the rounded outer edges such as 130 of the ridges 122 do not extend outwardly of the rotor circumference 123, the rotors may be closely juxtaposed tangentially, as indicated at 131, with minimal pressure loss therebetween. The conformations of the pistons 129 and their outer contact surfaces 132, and of the pintles and their ducting means, are the same as that described above with reference to FIGURES 10 and 11.

From the foregoing description it can be seen that the present invention has provided radial pistons and respective contacts therefor, adapted for use in opposed-rotor radial piston devices, which cooperate in a manner causing the least possible wear to the piston bores and to the pistons and the rotor surfaces engaged thereby.

It will also be observed that the present invention provides means whereby an opposed-rotor radial piston device may serve, in addition to its primary function, as a gear pump and a vane pump.

Particularly noteworthy is the fact that my present invention provides different pintle means which are effective to adapt opposed-rotor radial piston devices for use as radial piston pumps, internal combustion engines and power and pressure generators. This is believed to be a most substantial contribution to the general art.

Also from the above description it will be apparent that my present invention provides alternate conformations for the piston heads and for the rotor surfaces which they engage, each being particularly suited to one of the above mentioned operational functions.

It is also to be pointed out that the improvements in opposed-rotor radial piston pumps provided by this invention have been described in considerable detail in the form of specific embodiments for the purpose of complying with the statute, but it will be understood that various changes in the details of construction and location of the elements may be made without departing from the spirit and scope of my invention. Accordingly, it is to be understood that the foregoing description is considered as illustrative of, rather than limitative upon, the appended claims.

What is claimed is:

1. A radial piston pressure generating device, comprising: a pair of cylindrical rotors, each defining a cylinder block, having a plurality of radial bores disposed therein with arcuate peripheral notches regularly spaced therebetween and alternately thereof; pistons fitting slidably within said bores and having segmentally notched arcuate heads normally extending outwardly of the cylindrical sidewalls of said rotors; axially parallel retaining pins disposed through said rotors and through said segmental notches in said piston heads so as to hold the pistons in the bores said rotors being journalled on parallel stationary pintles having fluid inlet and exhaust ducts therein, said ducts opening laterally of said pintles in axial alignment with said radial bores; said inlet ducts opening into grooves formed circumferentially in said pintles and adapted to communicate simultaneously with a majority of said radial bores; said rotors being intergeared for contra-rotation and disposed with their respective circular surfaces in coplanar relationship and their cylindrical sidewalls substantially juxtaposed tangentially intermediate of said pintles, whereby the pistons of each of said rotors are alternately depressed inwardly of said bores upon rotative contact of their heads with said arcuate peripheral notches in the cylindrical sidewall of the other.

2. An opposed rotor radial piston pressure generating device, comprising: a fluid tight housing; a pair of stationary pintles disposed axially parallel interiorly of said housing and having fluid inlet and outlet ducts therein, one end of said ducts opening laterally of said pintles, the opposite ends opening outwardly of said housing; said inlet ducts opening into grooves extended circumferentially of said pintles and adapted to communicate simultaneously with a majority of said radial bores, and each of said exhaust ducts being adapted to communicate with only one of the bores in its respective rotor at a time; a pair of cylindrical rotors journalled on said pintles, each of said rotors having a plurality of radial bores disposed uniformly therein and opening inwardly in alignment with said apertures of said ducts and having arcuate peripheral notches alternately spaced between said bores; pistons fitting slidably within said bores and being provided with segmentally notched arcuate heads normally extended outwardly of the cylindrical sidewalls of said rotors and adapted for rotative engagement with said peripheral notches; axially parallel retaining pins disposed through said rotors and through said bores and said segmental notches in said piston heads so as to hold the pistons within the bores; said stationary pintles being spaced apart so as to bring the cylindrical sidewalls of said rotors into tangential juxtaposition along a line coincident with the axial plane of said parallel pintles; said rotors being intergeared for contra-rotation whereby the pistons of each of said rotors are alternately depressed inwardly of said bores upon engagement with said peripheral notches in the cylindrical sidewall of the other, thereby discharging under high pressure through one of said ducts fluid received in said bores at relatively low pressure from the other of said ducts.

3. An opposed rotor radial piston pressure generating device including the structure of claim 2 and wherein the two rotors are relatively positioned rotationally, and their exhaust ducts are proportionately dimensioned and located in their respective pintles in such a manner that only one radial bore in either of the two rotors communicates with an exhaust duct at any one time, and the possibility of back pressure being imposed by a piston in one rotor against a piston in the other rotor is thereby prevented.

4. In a pressure generating device, the combination comprising: pairs of cylindrical rotors being journalled on parallel stationary pintles, the pintles having fluid ducts therein and being spaced apart to bring the cylindrical sidewalls of said rotors into substantial tangential juxtaposition along a line coincident with the axial plane of said pintles; said rotors being intergeared for contra-rotation and having a plurality of radial bores disposed uniformly therein, said bores opening interiorly of said rotors and communicating with said ducts in said pintles; pistons fitting slidably within said bores and having segmentally notched arcuate heads normally extended outwardly of said sidewalls; spring means disposed in said bores adapted to urge said pistons outwardly thereof; and bandlike rings having perforations therein registering with the peripheral openings of said bores and adapted to receive the segmentally notched heads of said pistons slidably but non-rotatably therein, being disposed around the cylindrical sidewalls of said rotors and effective to hold said pistons in said bores.

5. A radial piston fluid pressure generating device, comprising: a fluid tight housing; a pair of stationary pintles disposed in axially parallel relationship interiorly of said housing; fluid ducts disposed interiorly of said pintles and opening laterally thereof at one end and communicating outwardly of said housing; a pair of cylindrical rotors journalled on said pintles; a plurality of radial bores disposed uniformly in each of said rotors and opening inwardly thereof in alignment with said lateral openings of said ducts, and arcuate peripheral surfaces regularly spaced between said bores in the cylindrical sidewalls of said rotors; pistons fitting slidably within said bores and having arcuate heads normally extended outwardly of said rotor sidewalls; the inner surface of said fluid tight housing being formed so as to provide clearance space circumferentially of the rotors for the normally extended piston heads, and to limit the outward extension of said pistons; said stationary pintles being spaced apart so as to bring the cylindrical sidewalls of said rotors into tangential juxtaposition intermediate of said parallel pintles; spring means disposed in said bores being adapted to urge said pistons outwardly thereof; said inlet ducts opening into grooves extended circumferentially of said pintles and adapted to communicate simultaneously with a majority of said radial bores, and said exhaust ducts communicating with only one of said bores at a time; said rotors being intergeared for contra-rotation whereby the pistons of each are alternately depressed inwardly of said bores upon rotating into contact with said arcuate peripheral notches of the other, thereby discharging through one of said ducts the fluid received in said bores from the other of said ducts.

6. A radial piston pressure generating device including the structure set forth in claim 5 and further characterized by ducting means, comprising: a main inlet duct opening inwardly of said fluid tight housing adjacent the point of rotational separation of said rotors; an intermediate duct communicating between said fluid tight chamber adjacent the point of rotational convergence of said rotors and one of said ducts disposed in and opening laterally of said pintles and adapted to communicate simultaneously with a majority of the radial bores in said rotors; and discharge ducts in each of said pintles communicating between only one of said bores at a time and a single high pressure discharge duct opening outwardly of said housing.

7. An opposed rotor radial piston pump adapted for use in a continuous flow fuel injection system, comprising: a fluid tight housing having a central partitioning member effective to provide two independently fluid tight chambers therein; a pair of stationary pintles disposed in axially parallel relationship interiorly of the first of said chambers; said pintles having fluid inlet and discharge ducts therein, one end of said ducts being apertured laterally of said pintles, the opposite ends opening outwardly of said housing; a pair of cylindrical rotors journalled on said pintles, each of said rotors having a spur gear portion disposed in the second of said fluid tight chambers and being rotatively rigid respectively therewith; power coupling means extended from one of said gear portions outwardly through said housing; said rotors having a plurality of radial bores disposed uniformly therein and opening inwardly thereof in alignment with said apertures of said ducts; arcuate cam surfaces disposed in the circumferential sidewall of said rotors between the openings of said bores therein; pistons fitting slidably within said bores and having segmental shoulder portions adapted to abut against transversely disposed retaining pins to hold said pistons interiorly of said rotors, and being provided with arcuate heads normally extended outwardly of the sidewalls of the rotors; said stationary pintles being spaced apart so as to bring the sidewalls of said rotors into tangential juxtaposition and align said spur gear portions thereof in meshing engagement; fluid inlet and discharge ducts entered into said second chamber on opposite sides of and adjacent to the point of enmeshment of said spur gears, said discharge duct communicating between the rotationally convergent side of said spur gears and said fluid inlet ducts interiorly of said pintles.

8. The opposed rotor radial piston pump as set forth in claim 7 in which said arcuate cam surfaces comprise: V-shaped notches disposed inwardly from the circumferential peripheries of said rotors between said radial bores therein, one side of said notches being faired arcuately into the circumferential surface of its rotor so as to present an oppositely curved surface adapted for rotative contact with said arcuate head of said piston.

9. An opposed rotor radial piston pressure generating device in accordance with claim 7 in which each of said arcuate cam surfaces comprises: a generally triangular ridge being parallel to the axis of the rotor and conformed within the main circumference of the rotor, the outer edge of the ridge being arcuate and adapted for rotative tangential contact with said arcuate heads of said pistons; and incut clearance spaces provided on each side of the ridge to receive lateral portions of a piston when the piston is obliquely disposed, relative to the ridge, during the approach and separation phases of each rotative contact.

10. An opposed rotor radial piston pressure generating device in accordance with claim 8 and further characterized by means adapting the structure described so as to serve additionally as a vane pump, comprising: the inner surface of said first fluid tight chamber in said housing being circularly formed circumferentially of said rotors so that uniform clearance space is provided between the housing and said rotors to permit said outwardly extended portions of said pistons to rotate through said clearance space with the outward ends of said pistons immediately adjacent said inner surface of said chamber; said rotors being relatively positioned so that said V-shaped notches of one rotor rotate into tangential adjacency with full diameter surface areas of the other rotor in a manner effective to minimize leakage of fluid pressure between said rotors; and ducts opening outwardly of said chamber adapted to enter and discharge fluid at opposite sides of the point of tangency of said rotors.

11. An opposed rotor radial piston pressure generating device in accordance with claim 9 and further characterized by means adapting the structure described so as to serve additionally as a vane pump, comprising: the inner surface of said fluid tight chamber of said fluid tight housing being circularly conformed whereby uniform clearance space for said extended pistons is provided between the housing and said rotors journalled therein, and said rotors being relatively positioned so that the incut clearance spaces of one rotor rotate into adjacency with full diameter surface areas of the other in a manner effective to minimize leakage of fluid pressure between said rotors.

12. An internal combustion engine including the combination comprising: a pair of cylindrical rotors defining cylinder blocks having axial bores therethrough and a plurality of radial bores therein communicating between the circumferential peripheries and the axial bores thereof; arcuate peripheral surfaces spaced alternately between the peripheral openings of said bores; pistons slidably disposed within said bores, the heads thereof being normally extended outwardly of said rotors; means for retaining said pistons in said bores; a fluid tight housing having exhaust cams formed interiorly thereof a pair of stationary pintles, having fuel inlet and exhaust ducts, affixed axially parallel in said housing, said pintles being adapted to receive said rotors rotatably thereon and being spaced apart so that the rotors journalled thereon engage each other tangentially therebetween; said fuel inlet ducts being adapted to communicate simultaneously with a majority of said radial bores in said rotors, and said exhaust ducts communicating with only one of said bores at a time; said rotors being intergeared for contra-rotation and being relatively positioned whereby the arcuate peripheral surfaces of each engage and depress the radial pistons of the other and compress fuel entered interiorly of said bores; conventional ignition means in said pintles effective to ignite said compressed fuel interiorly of said bores at the moment the pistons pass dead center alignment with the opposite rotor, thereby forcing each piston outwardly of its respective bore to impose thrust upon an arcuate surface of the opposite rotor; said cam means formed interiorly of said housing being effective to depress said pistons, to exhaust combustion gases from said bores, and then to move outwardly again when they have rotated into communication with said fuel inlet ducts.

13. An internal combustion engine in accordance with claim 12 in which said arcuate peripheral surfaces comprise: generally triangular ridges disposed transversely of the circumferential surface of the rotor and extended outwardly therefrom, the outward edges of the ridges being parallel to the axial centerline of the respective rotor and being arcuate in conformation and adapted to impose and receive thrust axially of the pistons during rotative tangential contact with said arcuate heads thereof.

14. An opposed rotor radial piston internal combustion engine in accordance with claim 12 in which said arcuate peripheral surfaces are formed in the manner of V-shaped notches disposed inwardly from the circumferential peripheries of said rotors between said radial bores therein, one side of said notches being faired arcuately into the circumferential periphery of its rotor so as to present a surface curved oppositely to that of said arcuate head of said piston, the two curved surfaces being adapted complementally so that the explosive force is centered axially of the piston and is impressed upon the rotor when the axial centerline of the piston is normal to the arc of said peripheral notch.

15. An opposed rotor radial piston internal combustion engine in accordance with claim 12 and further characterized by each of said arcuate peripheral surfaces being comprised of: a generally triangular ridge having its outer edge disposed parallel to the axis of the rotor and being formed entirely within the main circumference of the rotor, the outer edge of the ridge being arcuate and adapted for rotative tangential contact with one of said arcuate heads of said pistons; and incut clearance spaces provided on each side of the ridge to receive lateral portions of a piston when the piston is obliquely disposed, relative to the ridge, during the approach and separation phases of each rotative contact; the respective curves of said arcuate ridges and said arcuate piston heads being adapted complementally so that compressive force imposed by the ridge is effective axially of the piston, and the thrust of the piston is directed axially of the piston upon the surface of the ridge.

16. An opposed rotor radial piston internal combustion pressure generating device, comprising the combination of: fluid tight housing means; a pair of stationary pintles affixed interiorly of said housing; pairs of cylindrical rotors defining cylinder blocks, said rotors having axial bores therethrough and a plurality of radial bores spaced therein communicating between the circumferential peripheries and the axial bores thereof; arcuate peripheral surfaces alternately disposed between the outward openings of said bores; pistons slidably disposed within said bores, the heads thereof being arcuately formed and normally extended outwardly of said rotors; means for retaining said pistons within said bores; said rotors being journalled on said pintles; said pintles having fuel inlet and pressure outlet ducts therein communicating with said bores, and being spaced apart so that the rotors engage each other tangentially therebetween; said rotors being intergeared for contra-rotation and being relatively positioned whereby the arcuate peripheral surfaces of each engage and depress the radial pistons of the other and compress fuel entered interiorly of said bores; said fuel inlet ducts being adapted to communicate simultaneously with a majority of said radial bores in said rotors, and said pressure outlet ducts being adapted to communicate with one bore at a time at the moment when the bore and the piston therein are axially coincident with the common axial plane of the two rotors; conventional ignition means effective to ignite said compressed fuel interiorly of said bores at the moment they are in dead center alignment with the opposite rotor, thereby causing the force and fluid expansion of said compressed and ignited fuel to move outwardly of said bores through said pressure outlet ducts in said pintles.

17. An internal combustion pressure generating device as set forth in claim 16 in which said arcuate peripheral surfaces comprise: generally triangular ridges being disposed transversely of the peripheral surface of the rotor and parallel to the axis of the rotor and formed entirely within the normal circumference of the rotor, the outer edges of the ridges being arcuate and adapted for tangential rotative contact with said arcuate heads of said pistons; and incut clearance spaces being provided on each side of each ridge to receive lateral portions of a piston when the piston is obliquely disposed relative to the ridge during the approach and separation phases of each rotative contact.

18. An opposed rotor radial piston pressure generating device adapted to function simultaneously as a gear, vane and radial piston pump, comprising the combination of: a fluid tight housing divided so as to provide a first and a second fluid tight chamber therein; a pair of stationary pintles disposed in axially parallel relationship in said first fluid tight chamber; a pair of cylindrical rotors journalled on said pintles, each of said rotors having an axially aligned rotationally rigid spur gear portion disposed in said second fluid tight chamber; a plurality of radial bores in said rotors, and pistons fitting slidably in said bores and having heads normally extended outwardly of said rotors into uniform clearance space provided between the cylindrical sidewalls of the rotors and the inner surface of said first chamber; means for retaining said pistons in said bores; said stationary pintles being spaced apart so as to juxtapose said rotor sidewalls in substantial rolling contact along a line between and parallel to said pintles, and to align said spur gear portions in meshing engagement whereby said gears and said rotors revolve oppositely and the pistons of each rotor are alternately reciprocated by rotating into contact with the sidewall surface of the other rotor; and fluid duct means including a first inlet duct adapted to admit fluid at nominal pressure into said second fluid tight chamber adjacent the point of rotational separation of said spur gears therein, a second duct communicating between said second chamber adjacent the point of rotational convergence of said gears and said first chamber adjacent the point of rotational separation of said rotors, and a third duct communicating between said first chamber adjacent the point of rotational convergence of said rotors and fluid passageways in said pintles opening into a majority of the bores in each of said rotors, and discharge ducts in each of said pintles communicating with only one of said bores at a time and a single high pressure discharge duct.

19. In a radial piston pressure generating device including axially parallel cylindrical rotors counter rotating in tangential contact so that the outwardly extended heads of the radial pistons in each rotor are reciprocated by rotating into contact with the cylindrical surface of the other rotor, retaining means for holding the radial pistons in their respective bores, comprising: each of said pistons having a notch in its outwardly extended head, said notch being formed longitudinally of the piston along an axially parallel chordal plane and terminated in an axially transverse segmental shoulder; a retaining ring adapted to fit around the circumferential surface of the rotor and having a plurality of generally semicircular apertures adapted to receive the outwardly extended notched portions of said pistons slidably therein with the chordal portions of the apertures disposed against the chordal planes of said notches whereby continued outward movement of the pistons is arrested by the abuttment of said segmental shoulders of said notches against the inner surface of said retaining ring, and axial rotation of the pistons within the bores is prevented by the aligning contact of the chordal planar surfaces of the notches with the chordal portions or the apertures.

20. In an opposed rotor pressure generating device having axially parallel cylindrical rotors, with radial bores and pistons therein, contra-rotating in tangential contact so that the outwardly extended heads of the radial pistons in each rotor are depressed by coming into contact with the cylindrical surface of the other rotor, retaining means for holding the radial pistons in their respective bores, comprising: said pistons being cylindrical in form and each having a notch in its outwardly extended head, said notch being formed longitudinally of the piston along an axially parallel chordal plane and terminated in an axially transverse segmental shoulder; bores, disposed axially parallel through said rotors, adapted to chordally intersect said radial bores immediately inwardly of the circumferential surfaces of the rotors, and retaining pins in said bores adapted to align with the chordal planes and abut against the segmental shoulders of said notches in said piston heads so as to prevent said pistons from moving outwardly of said bores and from rotating relative to their respective axes.

21. The piston retaining means in accordance with claim 20 wherein said axially parallel bores open outwardly on each planar side of said rotors, and said retaining pins are round at each end, are fitted loosely in said bores and are retained therein by abutting contact of their rounded ends against adjacent inner surfaces of the housing in which said rotors are enclosed.

22. In a radial piston pressure generating device including a pair of cylindrical rotors journalled on axially parallel pintles and disposed in rolling contact so that the outwardly extended heads of the radial pistons in each rotor are reciprocated by coming into contact with the cylindrical surface of the other rotor, and any one piston is reciprocated during rotation of the rotors through an arc of less than forty five degrees, the fluid inlet and exhaust means, comprising: each of said pintles having fluid inlet and exhaust ducts disposed longitudinally therein and opening laterally thereof so as to communicate with said radial bores; said ducts being extended oppositely, from said lateral openings, through one end of said pintle and thence outwardly of the device; a semicircular groove formed in said pintle and extended circumferentially thereof so as to communicate simultaneously with more than one half of said radial bores and communicating also with said lateral opening of said inlet duct; and said lateral opening of said exhaust duct being formed in a manner adapted to communicate with only one of said bores at a time whereby the inlet phase for each bore and piston is several times longer than the exhaust phase in each reciprocative cycle.

References Cited in the file of this patent
UNITED STATES PATENTS

| | | |
|---|---|---|
| 823,717 | Ellis | June 19, 1906 |
| 868,100 | Krehbiel | Oct. 15, 1907 |